United States Patent [19]

Sekine et al.

[11] Patent Number: 5,025,184

[45] Date of Patent: Jun. 18, 1991

[54] SMALL-SIZED ELECTRIC MOTOR

[75] Inventors: Shuji Sekine; Naoto Harada, both of Yokohama, Japan

[73] Assignee: Jidoshi Denki Kogyo K.K., Kanagawa, Japan

[21] Appl. No.: 493,047

[22] Filed: Mar. 13, 1990

[30] Foreign Application Priority Data

Mar. 14, 1989 [JP]  Japan .................................. 1-28885[U]

[51] Int. Cl.$^5$ ........................ H02K 11/00; H02K 7/10; H02K 5/10
[52] U.S. Cl. ........................................ 310/71; 310/83; 310/88
[58] Field of Search ............... 310/40 MM, 71, 83, 87, 310/88, 89; 439/271, 277, 686, 687

[56] References Cited

U.S. PATENT DOCUMENTS

| | | | |
|---|---|---|---|
| 3,440,594 | 4/1969 | Hopp et al. | 310/71 |
| 4,572,979 | 2/1986 | Haar et al. | 310/71 |
| 4,614,886 | 9/1986 | Schneider et al. | 310/71 |
| 4,639,065 | 1/1987 | Kohler et al. | 310/83 |
| 4,673,836 | 6/1987 | Akiyama et al. | 310/89 |
| 4,709,124 | 11/1987 | Wheeler et al. | 310/71 |
| 4,710,658 | 12/1987 | Stahl | 310/71 |
| 4,712,029 | 12/1987 | Nold | 310/71 |
| 4,713,568 | 12/1987 | Adam et al. | 310/71 |
| 4,727,274 | 2/1988 | Adam et al. | 310/71 |

FOREIGN PATENT DOCUMENTS

| | | | |
|---|---|---|---|
| 1180043 | 10/1964 | Fed. Rep. of Germany | 310/71 |
| 0003548 | 1/1982 | Japan | 310/88 |
| 0021247 | 2/1984 | Japan | 310/71 |

Primary Examiner—Steven L. Stephan
Assistant Examiner—C. LaBalle
Attorney, Agent, or Firm—Sughrue, Mion, Zinn, Macpeak & Seas

[57] ABSTRACT

A small-sized electric motor which comprises a gear case having an end bracket, a holder base, a pair of plate terminals, a sealing member, a terminal container part provided with a projection having a tapered face, and a container cover provided with a projection having as tapered face forming a lower pair with the tapered face of the projection of said terminal container part. This motor has an excellent waterproof property because the end bracket is contact with the plate terminals very closely through the sealing member by the action of the lower pair.

1 Claim, 4 Drawing Sheets

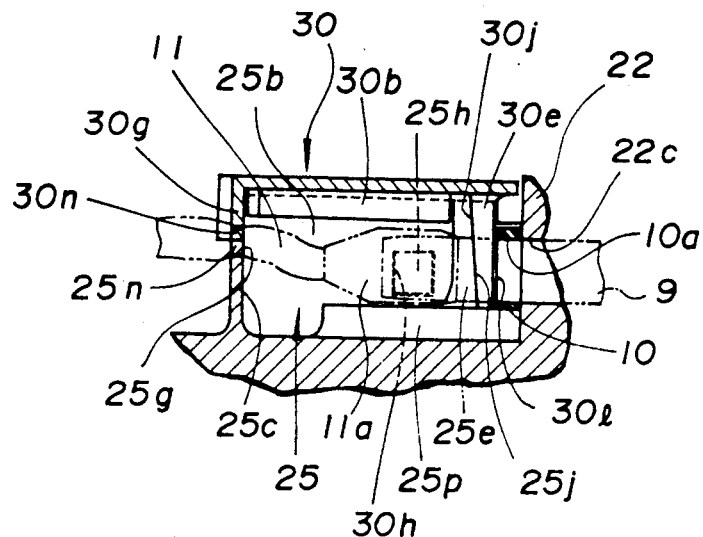
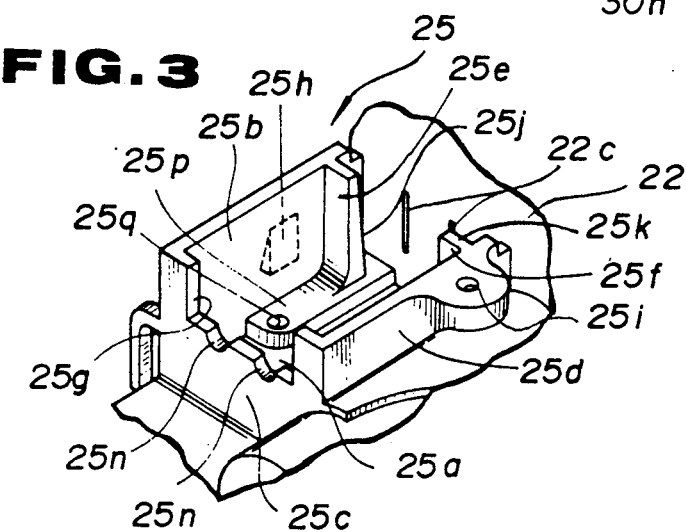
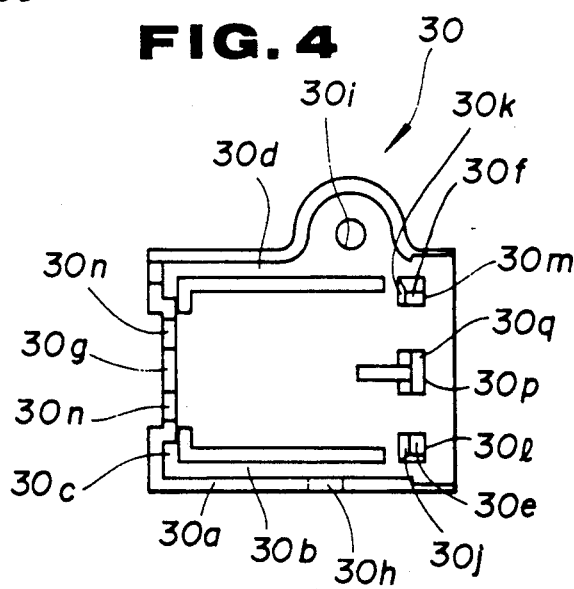

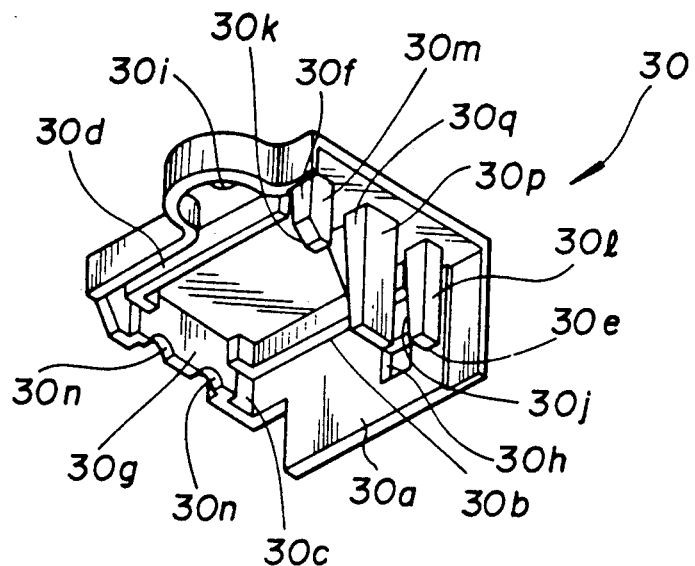
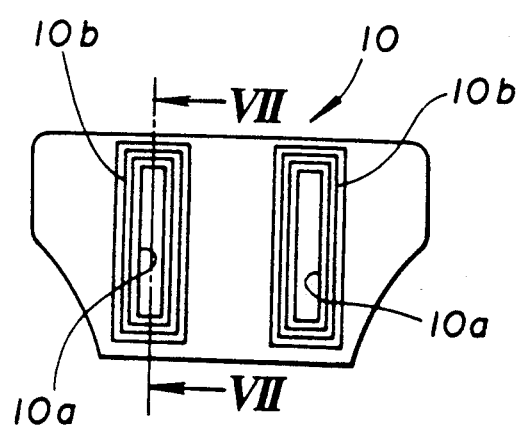

SMALL-SIZED ELECTRIC MOTOR

BACKGROUND OF THE INVENTION

1. Field of the Invention

This invention relates to a small-sized electric motor provided with a gear case having an end bracket, fitted with a holder base having a brush to said end bracked and used for, for example, a power window system of an automobile, and in particular to structure of the small-sized electric motor for connecting with a power source through a lead wire.

2. Description of the Prior Art

Heretofore, there has been used a power window motor for a motor vehicle as shown, for example, in FIG. 8 as a small-sized electric motor provided with a gear case having an end bracket.

A gear case 52 of a power window motor 51 shown in the figure is fixed to a motor case 53 by fastening an end bracket 52a provided on the left side thereof in the figure to an opening end of a motor case 53 with screw 54's, and fitted with a holder base 56 having a brush 55 to the face of the end bracket 52a on the side of the motor case 53.

In this power window motor 51, one end of a lead wire 58 piercing the end bracket 52a through a grommet 57 provided to said end bracket 52a is connected with a brush holder 59 supporting said brush 55 by soldering or the like, and a connector 60 provided to another end of said lead wire 58 is connected to the other lead wire (not showwn) connected to the power source. In this case, said lead wire 58 is fixed by a clip 62 to the upper part of a cover 61 of the gear case 52 in the figure so as not to be applied with tensile force to the connected portion between the lead wire 58 and the brush holder 59.

However, in the structure of the conventional small-sized electric motor 51 for connecting with a power source as described above, there is a problem since there is the possibility that water penetrates into the motor case 53 from the gap between the end bracket 52a and the grommet 57 caused by the deformation of the grommet 57 if said lead wire 58 is fixed at the stretched or the distorted state at the time of fixing the lead wire 58 to the cover 61 by the clip 62.

And there are different problems in that another end of said lead wire 58 provided with the connector 60 may be a hindrance in case of transporting the power window motor 51 or mounting it to the vehicle body, and it is impossible to reduce the cost in the conventional structure to connect the lead wire 58 with the brush bolder 59 directly since said lead wire 58 is expensive relatively.

SUMMARY OF THE INVENTION

This invention is made in view of the aforementioned problems of the prior art, and an object of the invention is to provide a small-sized electric motor having structure which is possible to prevent the penetration of water into the inside of the small-sized electric motor from the gap between the end bracket and the lead wire, and possible to transport or mount the small-sized electric motor (mounting to the vehicle body in the case the small-sized electric motor is the power window motor for the motor vehicle, for example) without hindrance, additionally possible to contribute to reduce the cost.

The constitution of the small-sized electric motor according to this invention for attaining the above-mentioned object is characterized by comprising a gear case having an end bracket, a holder base provided with a brush and fitted to said end bracket, a pair of plate terminals provided to said holder case, connected with said brush at the base ends thereof and protruding through the end bracket in the opposite direction of the holder base at the tip ends thereof, a sealing member fitted on the tip ends of said plate terminals, a terminal container part formed in one body with the gear case contigeously to said end bracket for housing the tip ends of said plate terminals, and a container cover for covering said terminal container part, said terminal container part being provided with a container-side projection having a tapered face inclined to the end bracket side, said container cover being provided with a cover-side projection having a tapered face forming a lower pair with thr tapered face of the container-side projection provided to said terminal container part and a sealing member-pressing face on the reverse side of said tapered face of the cover-side projection, and said sealing member being pressed toward the end of bracket with the sealing member-pressing face of the cover-side projection provided to the container cover by a lower pair of said both tapered faces at the state of connecting lead wires for power supply to the tip ends of said plate terminals and covering the terminal container part with said container cover.

In the small-sized electric motor according to this invention, covering the terminal container part with the container cover at the state in which the lead wires for power supply are connected to the tip ends of one pair of plate terminals sited in the terminal container part, the container cover shifts to the bracket side and the sealing member pressing face of the cover-side projection presses the sealing member onto the end bracket side in accordance with the formation of the lower pair between the tapered face of the container-side projection inclined to the end bracket side and the tapered face of the cover-side projection. Thereby, the gap between the end bracket and the plate terminals piercing through said end bracket is closed, and the waterproof of this part is improved.

And, in said small-sized electric motor, because the lead wires connected to the power source are connected with the plate terminals at the assembly site of the motor, the motor is enabled to be transported or mounted without being disturbed by the lead wires unlike the conventional small-sized electric motor.

Furthermore, because the lead wires connected to the power source are connected to the brushes through the one pair of plate terminals in the small-sized electric motor according to this invention, the amount of the lead wire used decreases as compared with the conventional motor and the cost of the small-sized electric motor according to this invention may be reduced.

BRIEF DESCRIPTION OF THE DRAWINGS

FIG. 2 is a sectional view along section lines II—II of FIG. 1;

FIG. 3 is an enlarged fragmentary perspective view illustrating the terminal container part of the motor shown in FIG. 1 in detail;

FIG. 4 is an enlarged side view from the side of the terminal container part illustrating the container cover of the motor shown in FIG. 1 in detail;

FIG. 5 is an enlarged perspective view illustrating the container cover of the motor shown in FIG. 1 in datail;

FIG. 6 is an enlarged front view illustrating the rubber packing of the motor shown in FIG. 1 in detail;

FIG. 7 is a sectional view along section lines VII—VII of FIG. 6; and

DESCRIPTION OF THE PREFERRED EMBODIMENT

An embodiment of the small-sized electric motor according to this invention will be described below on basis of drawings.

FIG. 1 to FIG. 7 show an embodiment of the small-sized electric motor according to this invention, the embodiment is explained by examplifying the case said motor is a power window motor for a motor vehicle.

Figure 1:
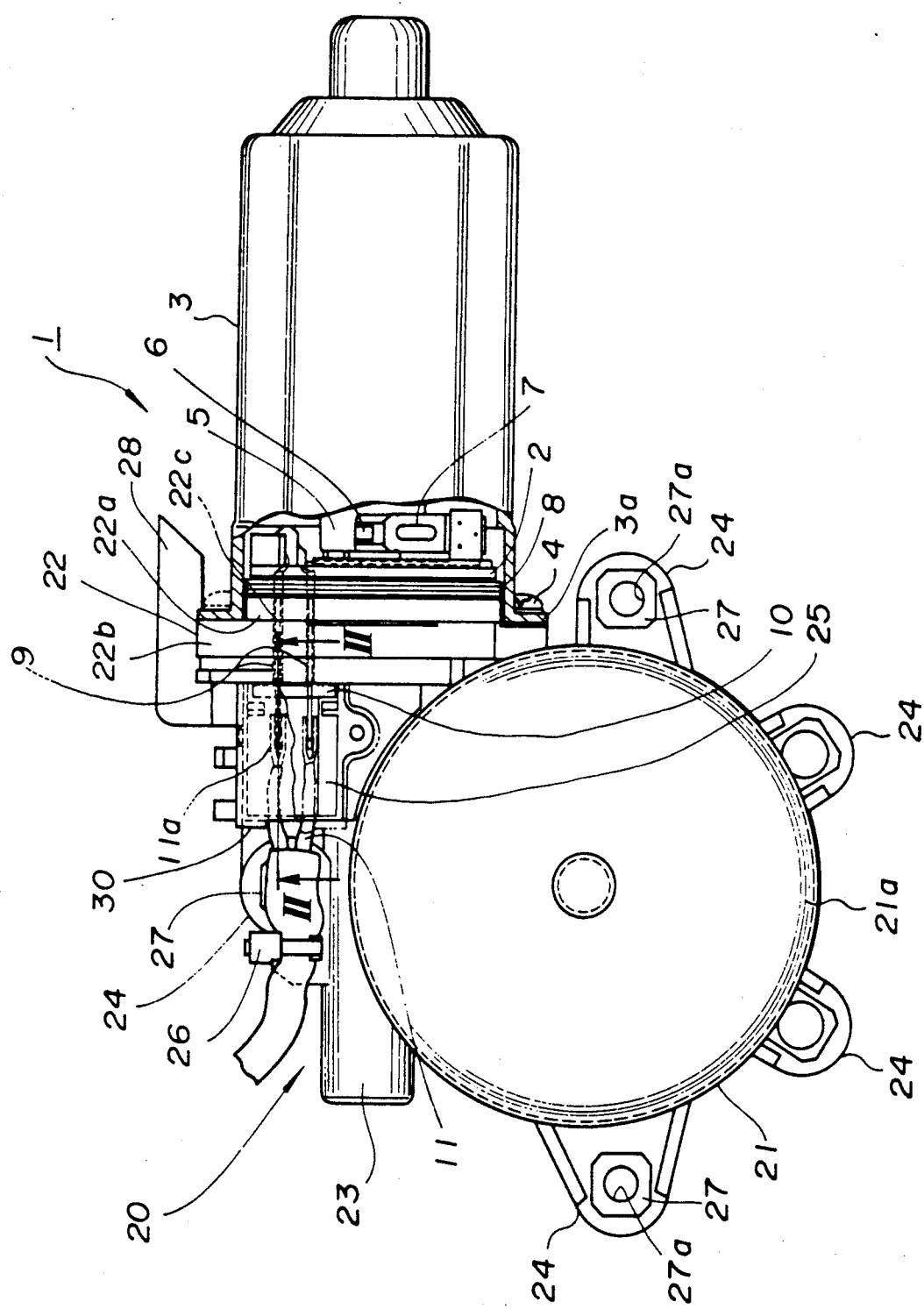
FIG. 1 shows an embodiment of the small-sized electric motor according to this invention, and is a partially sectional side view illustrating the case in which said motor is a power window motor.
Figure 8:
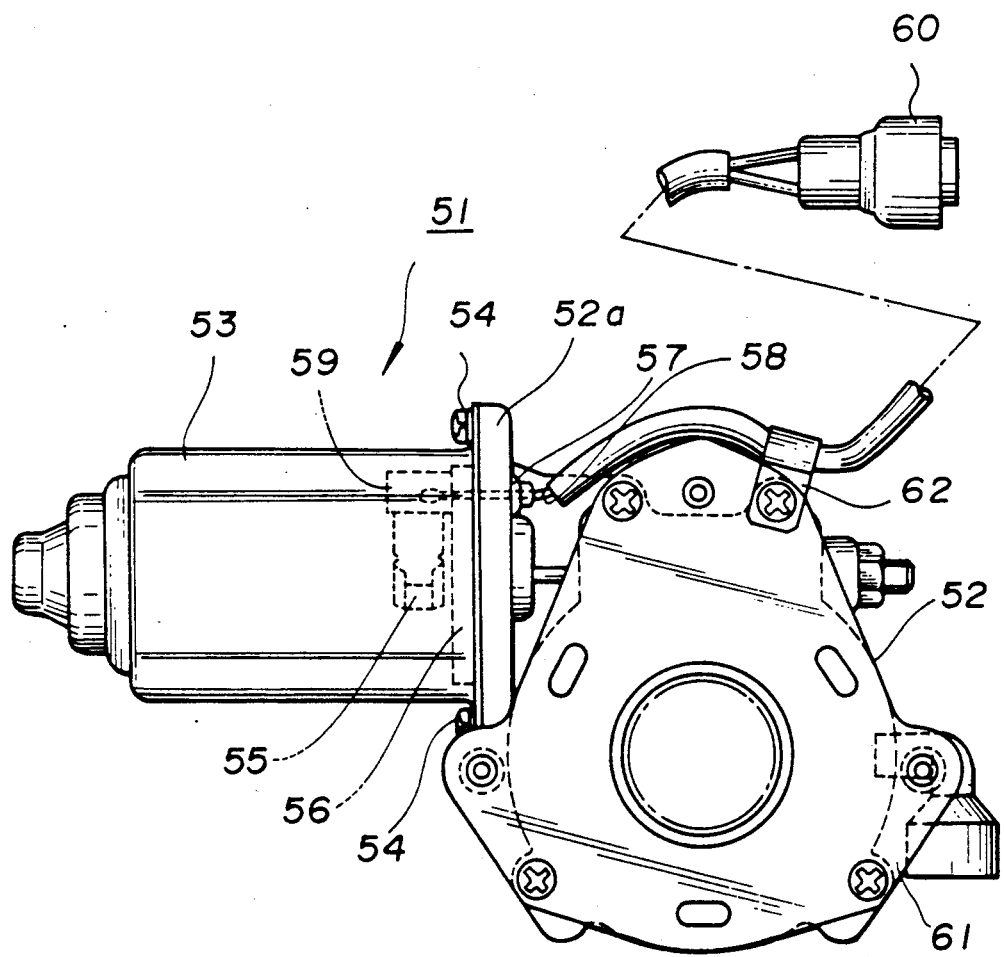
FIG. 8 is a side view illustrating the structure of the conventional small-sized electric motor (power window motor) for connecting with the power source.

That is, a power window motor 1 shown in the FIG. 1 has a gear case 20 formed with a case body 21 having a flat and bottomed cylindrical shape and housed with a reduction gear (not shown) in the inner part thereof to be covered with a cover 21a, an end bracket 22 fitted with a holder base 2, a bearing part 23 for receiving an end of an output shaft (not shown) of the power window motor 1, and plural protrusion part 24's (of which number is five in this embodiment) for mounting this power window motor 1 on the vehicle body, in one united body. Said gear case 20 is fixed to a motor case 3 by fastening a flange 22b of said end bracket 22 to a flange 3a of the motor case 3 with screw 4's at the state of fitting a motor case-fitting part 22a of the end bracket 22 fitted with said holder base 2 into an opening of the motor case 3.

The holder base 2 fitted to said end bracket 22 is provided with a pair of brush holders 7 and (7) holding brushes 6 and (6) respectively, and a sealing 8 is set on the periphery of said holder base 2.

And, in order to connect the power window motor 1 with the power source, said motor 1 has the construction comprising a pair of plate terminals 9 and 9 fixed to the holder base 2 so as to be connected with the brush holders 7 and (7) at the base ends respectively and to protrude through terminal holes 22c and 22c formed in the end bracket 22 in the opposite direction of the holder base 2 at the tip ends thereof, a rubber packing 10 fitted on the tip ends of said plate terminals 9 and 9 as a sealing member, a terminal container part 25 formed in one body with the gear case 20 contiguously to the end braket 22 housed with the tip ends of the plate terminals 9 and 9 and the rubber packing 10, and a container cover 30 covering said terminal container part 25. And the motor 1 is so structured as to cover the terminal container part 25 with said container cover 30 in the state of connecting clip shaped connectors 11a and 11a provided to one ends of lead wires 11 and 11 connected with the power source at the other ends (not shown) to the tip ends of said one pair of plate terminals 9 and 9, and said lead wires 11 and 11 are fixed by a clip fitted to the bearing part 23.

Said rubber packing 10 is, as shown in FIGS. 6 and 7, provided with projections 10b and 10b around about terminal holes 10a and 10a on the both sides respectively, and the rubber packing 10 is fittes on the one pair of plate terminals 9 and 9 at the state in which the projection 10b on either side is contact with the end bracket 22.

Said terminal container part 25 has, as shown in FIG. 3, the structure comprising a bottom 25a, and the end bracket 22 and three walls 25b, 25c and 25d sorrounding said bottom 25a. The terminal container part 25 has container-side projections 25e and 25f provided respectively in the position near to the end bracket 22 on the bottom 25a along the inside of the walls 25b and 25d facing each other and a cutout 25g provided to the wall 25c opposite to the end bracket 22, and is provided with a cover catch 25h and a hole 25i on the outside of the walls 25b and 25d facing each other, respectively.

In this case, said container-side projections 25e and 25f are provided with tapered faces 25i and 25k inclined to the side of the end bracket respectively, and said cutout 25g is provided on the base thereof with two semi-circular shaped lead wire holders 25n and 25n formed smaller than the sectional shape of said lead wire 11 slightly.

And, the terminal container part 25 has a rise part 25p between the bottom 25a and the container-side projection 25e. Said rise part 25p is formed with a through hole 25q passing through the end bracket 22 and opening on the rise part 25p and on the side of the holder base 2, the air introduced to the holder base 2 from a breather cap 28 fitted to the gear case 20 is conducted to the terminal container part 25 from the holder base 2 through said through hole 25g.

Said container cover 30 has, as shown in FIGS. 4 and 5, fitting recesses 30b, 30c and 30d for fitting on the upper end of the walls 25b, 25c and 25d of said terminal container part 25, cover-side projections 30e and 30f formed so as to be sited between the rubber packing 10 fitted on the plate terminals 9 and 9 and the container-side projections 25e and 25f in the state of covering the terminal container part 25 with said container cover 30, and a step part 30g for fitting into the cutout 25g of the terminal container part 25.

And the container cover 30 is provided with tapered faces 30j and 30k for forming the lower pair with the tapered faces 25j and 25k formed to the container-side projections 25e and 25f to said cover-side projections 30e and 30f, and with packing-pressing faces (sealing member-pressing faces) 30l and 30m on the reverse side of said tapered facess 30j and 30k. Namely, at the state of covering the terminal container part 25 with the container cover 30 as shown in FIG. 2, the container cover 30 is moved toward the end bracket 22 and the rubber packing 10 is pressed against the end bracket 22 with respective packing-pressing faces 30l and 30m of the cover-side projections 30e and 30f by the lower pair between respective tapered faces 25j, 25k of the container-side projections 25e, 25f and respective tapered faces 30j, 30k of the cover-side projections 30e, 30f, therefore, the waterproof between the end bracket 22 and the plate terminals 9, 9 may be improved by contacting the projection 10b of said rubber packing 10 with the end bracket 22 more closely. In this case, an auxiliary projection 30q having a packing-pressing face 30p is provided between the cover-side projections 30e and 30f so as to insure the waterproof between the end bracket 22 and the plate terminals 9, 9 by pressing the center of the packing 10.

The container cover 30 is provided to the step part 30g thereof with lead wire holders 30n and 30n corresponding to the lead wire holder 25n and 25n provided to the cutout 25g of said terminal container part 25. The lead wires 11 and 11 are fixed by holding them between the lead wire holders 25n, 25n of the terminal container part 25 and the lead wire holders 30n, 30n of the container cover 30 at the time of covering the terminal container part 25 with the container cover 30 so that the connectors 11a and 11a of the lead wires 11 and 11 may not disconnect from the tip ends of the plate terminals 9 and 9 so easily.

Furthermore, the container cover 30 is provided in a side cover 30a formed continuously on the fitting recess 30b with an opening 30h for engaging to the cover catch 25h formed on the wall 25b of the terminal container part 25, and is provided in the fitting recess 30d with a through hole 30i corresponding to the hole 25i formed in the wall 25d of the terminal container part 25. And said container cover 30 is fixed to the terminal container part 25 by screwing a tapping screw (not shown) passed through the through hole 30i into said hole 25i at the state of covering the terminal container part 25 and engaging the opening 30h onto the cover catch 25h of the terminal container part 25.

At the time of mounting the above-mentioned power window 1 on the vehicle body, nut 27's formed with femal screw part 27a's are disposed to three protrusion part 24's among said plural protrusion part 24's respectively (in this embodiment, the protrusion part 34's existing on the upper side and, the left and right sides), and the motor 1 is fixed to a motor bracket by screwing bolts passed through the motor barcket into the femal screw part 27's of said nut 27's.

Nextly, explanation will be given on the procedure for connecting the power source to the power window motor 1 having the aforementioned structure.

First of all, the power window motor 1 is mounted to the motor bracket provided to the prescribed position of the vehicle body by screwing the bolts into the femal screw part 27a's of the nut 27's disposed to the protrusion part 24's of the gear case 20. At this time, it is possible to carry out the setting work of the power window motor 1 smoothly because the motor 1 is not yet provided with the lead wire protruding outwardly.

Subsequently, the container cover 30 which is attached temporarily to the container cover 30 by engaging the opening 30h to the cover catch 25h of the terminal container part 25 is removed from said terminal container part 25. And the clip-like shaped connectors 11a and 11a provided to the ends of the lead wires 11 and 11 connected with the power source at the other ends (not shown) are connected respectively to the tip ends of one pair of plate terminals 9 and 9 disclosed. And, pressing the rubber packing 10 fitted on said plate teminals 9 and 9 toward the end bracket 22, the projection 10b of the rubber packing 10 is made contact closely with the end bracket 22 and said lead wires 11 and 11 are fitted into the lead wire holders 25n and 25n of the terminal container part 25. Then, the terminal container part 25 is covered with the container cover 30, and the container cover 30 is pressed till the opening 30h is engaged with the cover catch 25h. Hereupon, the container cover 30 is moved toward the end bracket 22 and the respective packing-pressing faces 30l and 30m of said cover-side projections 30e and 30f and the packing-pressing face 30p of the auxiliary projection 30q press the rubber packing 10 against the end bracket 22 by forming the lower pair between the respective tapered faces 25j, 25k of the container-side projections 25e, 25f of the terminal container part 25 and the respective tapered faces 30j, 30k of the cover-side projections 30e, 30f of the container cover 30, therefore the waterproof between the end bracket 22 and the plate terminals 9, 9 is improved surely by contacting the projection 10b of the rubber packing 10 with the end bracket 22 more closely.

And, the contaner cover 30 is fixed to the terminal container part 25 by passing the screw (not shown) through the hole 30i of the container cover 30 and screwing it into the hole 25i of the terminal container part 25. In this state, said lead wires 11 and 11 are fixed by catching them between the lead wire holders 25n, 25n of the terminal container 25 and the lead wire holders 30n, 30n of the container cover 30, besides are fixed to the gear case 20 by the clip 26 at the position near to one ends of the lead wires 11 and 11. Therefore, the connectors 11a and 11a of the lead wires 11 and 11 are never disconnected from the plate terminals 9 and 9 even if the lead wires are applied with tensile force.

Although the power window motor 1 is examplified in this embodiment as the small-sized electric motor according to this invention, this invention is not limited to power window motor.

And, the detailed construction of the small-sized electric motor according to this invention is not limited to the construction of the embodiment described above.

As explained above, the small-sized electric motor according to this invention comprises a gear case having an end bracket, a holder base provided with a brush and fitted to said end bracket, a pair of plate terminals provided to said holder base, connected with said brush at the base ends thereof and protruding through the end bracket in the opposite direction of the holder base at the tip ends thereof, a sealing member fitted on the tip ends of said plate terminals, a terminal container part formed in one body with the gear case contiquously to said end bracket for housing the tip ends of said plate terminals, and a container cover for covering said terminal container part, said terminal container part being provided with a container-side projection having a tapered face inclined to the end bracket side, said container cover being provided with a cover-side projection having a tapered face forming a lower pair with the tapered face of the container-side projection provided to said terminal container part and a sealing member-pressing face on the reverse side of said tapered face of the cover-side projection, and sealing member being pressed toward the end bracket with the sealing member-pressing face of the cover-side projection provided to the container cover by a lower pair of said both tapered faces at the state of connecting lead wires for power supply to the tip ends of said plate terminals and covering the terminal container part with said container cover. Therefore, it is possible to prevent securely the penetration of water into the inner part of the small-sized electric motor from the part in which the lead wires are connected to the motor on the end bracket, and possible to improve the workability of the trasportation or the attaching of the motor. In addition to above, an excellent effect can be obtained since it is possible to reduce the cost of the motor.

What is claimed is:

1. A small-sized electric motor comprising:
   a gear case having an end bracket;
   a holder base provided with a brush and fitted to said end bracket;
   a pair of plate terminals provided to said holder base, connected with said brush at the base ends thereof and protruding through the end bracket in the opposite direction of the holder base at the tip ends thereof;

a sealing member fitted on the tip ends of said plate terminals;

a terminal container part formed in one body with the gear case contiguously to said end bracket for housing the tip ends of said plate terminals; and a container cover for covering said terminal container part;

said terminal container part being provided with a container-side projection having a tapered face inclined to the end bracket side;

said container cover being provided with a cover-side projection having a tapered face forming a lower pair with the tapered face of the container-side projection provided to said terminal container part and a sealing member-pressing face on the reverse side of said tapered face of the cover-side projection; and said sealing member being pressed toward the end bracket with the sealing member-pressing face of the cover-side projection provided to the container cover by a lower pair of said both tapered faces at the state of connecting lead wires for power supply to the tip ends of said plate terminals and covering the terminal container part with said container cover.

* * * * *